Feb. 25, 1930.  A. J. MURRAY  1,748,581

SCREEN PROPELLER FOR MARINE VESSELS

Filed Oct. 18, 1924

INVENTOR
Athole J. Murray
BY
Joseph F. O'Brien
ATTORNEY

Patented Feb. 25, 1930

1,748,581

UNITED STATES PATENT OFFICE

ATHOLE J. MURRAY, OF WEST NEW BRIGHTON, NEW YORK; BERTHA A. MURRAY EXECUTRIX OF THE ESTATE OF SAID ATHOLE J. MURRAY, DECEASED

SCREW PROPELLER FOR MARINE VESSELS

Application filed October 18, 1924. Serial No. 744,325.

This invention relates to improvements in screw propellers for marine vessels.

One of the objects of this invention is to produce a screw propeller for marine vessels which will have increased mechanical efficiency over existing propelling devices, that is to say, a larger propelling power in proportion to the unit of power delivered to the shaft than propellers heretofore used.

Another object of this invention is to produce a propeller which for a given turning speed or angular velocity will be capable of operating efficiently with an increased disc area or with an increased "aspect ratio," this term being employed to designate what is termed the slip angle with reference to a screw propeller of "true screw" design.

Another object of this invention is to produce a propeller which will operate efficiently at high angular velocities.

Another object of this invention is to produce a screw propeller, the blades of which will have great stiffness and rigidity.

Another object of this invention is to produce a screw propeller which can be used to replace screw propellers now in use and when thus employed will afford greater economy of operation over such replaced propellers by propelling the vessel at a greater speed for a given unit of power at the shaft, or by propelling the vessel at a similar speed with a decreased expediture of horse power, or by producing a simultaneous saving of shaft horse power and increase in speed of propulsion, or by propelling the vessel at slightly less speed with greatly diminished horse power, or by propelling at a greatly increased speed for a small increase in shaft horse power.

Another object of this invention is to produce a screw propeller which in its preferred embodiment will embody in itself a means for preventing the fluid which passes through the propeller from having a rotating movement such as is incidental to the movement of the water through a screw propeller of true screw form, thus eliminating any mechanism extraneous to the screw propeller which is designed to prevent the rotation of the race, and also eliminating the cost of extraneous mechanism designed to redirect the revolving race when produced and so to recover the power lost in producing the aforesaid rotation of the race.

Another object of this invention is to produce a screw propeller of such form that the water will glide past the blades without appreciable loss of energy due to shock, and furthermore will attain this result when all the fluid motions are given due consideration in the determination of the relative motions of the screw-propeller blades and the passing water.

Another object of my invention is to produce a screw propeller which will create improved conditions for manœuvring or steering a vessel in water.

Another object of my invention is to produce an improved form of screw propeller without increasing the cost of production.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Referring now to these drawings which illustrate a preferred embodiment of my invention, B indicates a blade which may be connected to the driving shaft 3 in any suitable manner and may, if desired, be formed integrally with a boss 2 which, as shown, is mounted on the driving shaft and secured on said shaft by a nut 4. The boss, shaft and nut may have any of the conventional forms now in current practice. A single blade only is illustrated but it will be understood that the remaining blades are similar to the one shown and that the remaining blades may be of any conventional number, and that it is the form or outline of the blade and not the number or manner of mounting the blades that constitutes the essence of my invention.

In accordance with my invention, I produce a propeller blade so formed as to provide on the driving face of the blade from the leading edge to the following edge a substantially concavo-convex surface, viz., a surface which is substantially concave adjacent to the leading edge and convex adjacent to the following edge, and in the preferred form of my invention said blade face will have a substantially helicoidal curvature and the concave surface and convex surface of said concavo-convex surface will merge with each other at the center line of the blade, so that the driving surface of the blade at that side of said center line which extends to the leading edge will be concave while the driving surface of the blade from said center line to the following edge will be substantially convex. In a blade having a driving face of the preferred form specified, allowance will be made for the disposition of the blade thickness at the back of the blade; and in the preferred embodiment of my invention the opposite or back surface of the blade will also have the form above specified.

Figure 1:
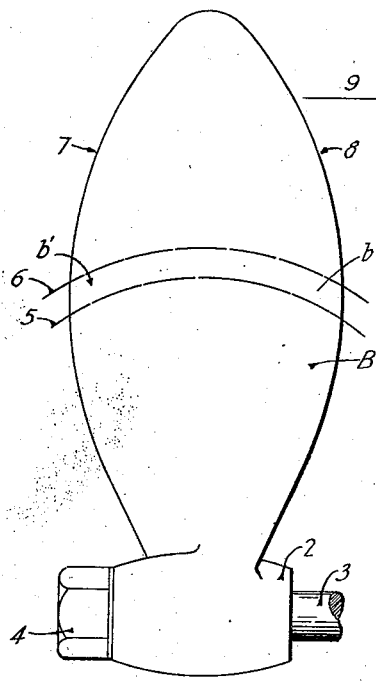
Fig. 1 is a side or athwartship elevation of one of the blades of a screw propeller embodying my invention including the boss and driving shaft to which the boss is connected.
Figure 2:
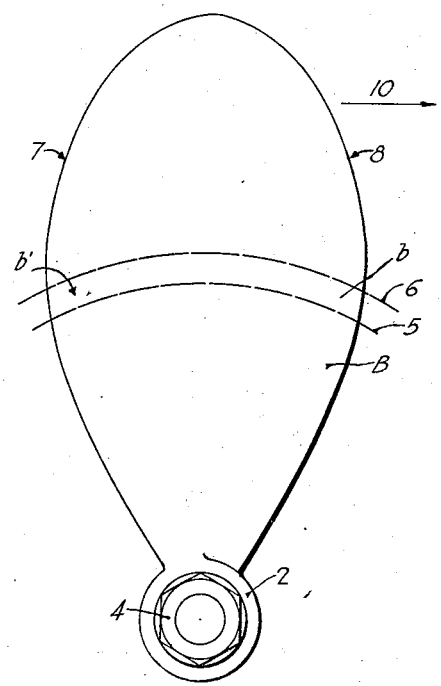
Fig. 2 is an end view of the blade, boss and shaft shown in Fig. 1 and looking in the direction of the arrow in said figure.
Figure 3:
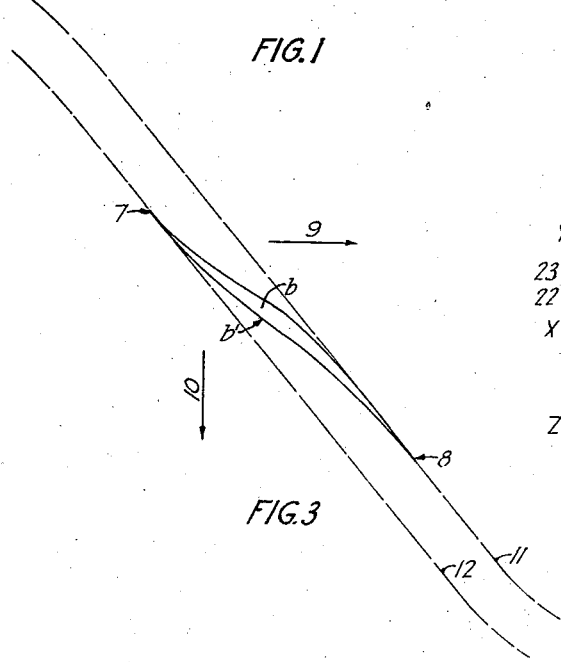
Fig. 3 is a plan view of an elementary, circumferential strip of the blade included between imaginary cutting cylinders concentric with the driving shaft.

In order more clearly to show and describe the preferred form of my propeller blade, I have in Figs. 1 and 2 indicated by broken lines 5 and 6 two imaginary cutting cylinders concentric with the shaft 3, so as to include between their intersections with the blade surface a circumferential blade strip $b$, which, when projected into the plan view of Fig. 3, will have substantially the concavo-convex form shown in said figure, in which the arrow 9 will indicate the fore-and-aft direction of travel of the screw propeller relative to the surrounding medium as the vessel and attached propeller are propelled forward and the arrow 10 will indicate the instantaneous direction of motion of the propeller blade which is taken as rotating clockwise or in the direction of the arrow 10 in Fig. 2.

With these directions of motions, 8 indicates the end of the elementary strip at the leading edge of the propeller blade and 7 the end of said strip on the following edge of the propeller blade. Under conditions of uniform or steady motions of fore-and-aft travel and rotation, these ends 7 and 8 of the circumferential strip will have spiral motions each describing a helix as indicated in said Fig. 3 by the broken lines 11 and 12 respectively; and the form or shape of the circumferential strip $b$ is preferably such that the edge or end 8 will be tangential with and merge into the helix 11 and the following end 7 will be tangential with and merge into the helix 12. The intermediate portion of the strip has a contraflexual or concavo-convex form from the leading to the following edge giving an easy transition from the form at the leading end or edge to the form at the following end or edge.

It follows from the conditions above specified that the two helices traced by the ends or edges 7 and 8 while in motion will resemble adjacent threads of a double threaded screw and that each of these helices will have the same pitch and pitch angle. It will be apparent also that any other arbitrarily chosen circumferential strip of my improved propeller blade obtained in the same manner will have similar characteristics, the end portions 7 and 8 being tangential to helices having the same pitch and pitch angle, but having the same pitch and a different pitch angle to the helices for the preceding strip. It will be understood that the pitch angle will depend upon the radii of the imaginary cutting cylinders.

By means of this form of blade surface, the surrounding water contiguous to the blade is caused to have such a relative motion to the propeller blade that it glides past the leading edge in the direction of some such helix as indicated by the broken line 11, and leaves the blade in the direction of some such helix as indicated by the broken line 12, and when the preferred form of my invention is used this relative movement takes place without shock and the consequent loss of energy caused thereby and also without causing the water to receive the rotary motion usually imposed by propellers of "true screw" form, thus conserving the power usually lost in producing such rotary motion. My invention, therefore, embodies in itself a means for preventing the water passing through the propeller from having such a rotating movement, and eliminates the cost of extraneous mechanism designed to redirect the revolving race for the purpose of recovering the power lost in producing the aforesaid rotation of the race, and my invention also eliminates the use of any mechanism extraneous to the screw propeller which is designed to prevent the aforesaid rotation of the race.

The blade form, as hereinabove described, has been treated as though it were a curved surface having no thickness. It is contemplated, however, in the preferred form of my invention to have the driving face $b'$ of the plate, viz., the face shown in Figs. 1 and 3, coincide with the superficial form above specified and to dispose the material thickness of the blade at the rear of a driving surface of this configuration. It will be understood, however, that many variations of my invention may be produced by disposing the thickness of the blade partly at the rear and partly at the front of the outline or superficial form above specified, while still retaining the characteristics of said superficial form, and that the rear surface of the blade may have this form or a somewhat different form, but that any such variations or modified forms will come within the spirit of my invention as expressed in the appended claims.

It will furthermore be understood that the line of merger between the concave and convex surfaces may also, without departing from the spirit of my invention, be shifted somewhat to opposite sides of the center line of the blade so that the driving surface of the blade will have more or less concavity or more or less convexity, this concavity and convexity, however, being always disposed so that the concavity will be adjacent to the leading edge and the convexity adjacent to the following edge of the blade.

The blade form, which has been described above by means of a representative strip or section can be readily comprehended as a whole by the following description of a mechanical method of sweeping the said blade form. Thus, in Fig. 4 21 indicates a rod terminating in a boss 22, which boss is bored so as to be able to slide and turn on a pivotal rod 23.

Figure 4:
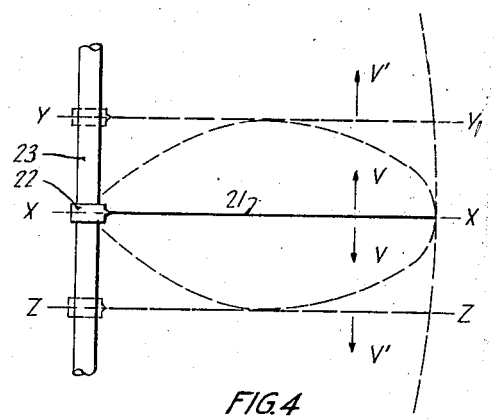
Fig. 4 is a diagrammatic view illustrating a mechanical method of sweeping out or tracing the blade form shown in Figs. 1 to 3.

Starting with the rod 21 in the position X—X shown in said Fig. 4, it is given a uniform clockwise angular motion and at the same time moved upwards, this upward motion beginning with the velocity $v$ but decreasing to another velocity $v'$ at the position Y—Y. The rod 21 is now replaced in its first position at X—X and then moved downwards beginning with the velocity $v$ and terminates with the smaller velocity $v'$ at Z—Z. During this downward motion the rod is rotated with a uniform counter-clockwise angular velocity equal to the above clockwise velocity. During these upward and downward motions the rod 21 will trace out in space a surface from which the blade can be templated and cut out on the dotted contour shown projected in to the surface above formed.

Having described my invention, I claim:—

1. A screw propeller for marine vessels having blades, each having a driving face of substantially concavo-convex curvature across the said face, the concave and convex portions being of substantially similar curvature and pitch and the concave portion being adjacent to the leading edge and the convex portion adjacent to the following edge, said blade face also having a helicoidal curvature and said surface being so arranged that the concave and convex portions thereof will, respectively, be substantially tangential during rotation to helical paths of motion that each travel relative to the surrounding medium.

2. A screw propeller comprising a plurality of blades, each provided with a driving face having a contour produced by connecting portions of the screw surfaces of two adjacent threads of a double-threaded screw of similar pitch by a transition surface of concavo-convex curvature, the opposite ends of said transition surface being, respectively, tangential to the adjacent threads of said double-threaded screw.

3. A screw propeller comprising a plurality of blades, each provided with a driving face having a contour produced by connecting portions of the screw surfaces of two adjacent threads of a double-threaded screw of similar pitch by a transition surface of concavo-convex curvature, the concave portion of said concavo-convex curvature being arranged adjacent to the leading edge and the convex portion being arranged adjacent to the following edge of said blade and the opposite ends of said transition surface being, respectively, tangential to the adjacent threads of said double-threaded screw.

In witness whereof, I have signed my name to the foregoing specification.

ATHOLE J. MURRAY.